(12) United States Patent
Kwak et al.

(10) Patent No.: US 10,701,653 B2
(45) Date of Patent: Jun. 30, 2020

(54) SIGNAL RECEIVING METHOD AND APPARATUS IN DEVICE-TO-DEVICE WIRELESS COMMUNICATION

(71) Applicant: Samsung Electronics Co., Ltd., Suwon-si, Gyeonggi-do (KR)

(72) Inventors: Yongjun Kwak, Yongin-si (KR); Sangmin Ro, Seoul (KR); Juho Lee, Suwon-si (KR); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/571,437

(22) PCT Filed: May 4, 2016

(86) PCT No.: PCT/KR2016/004710
§ 371 (c)(1),
(2) Date: Nov. 2, 2017

(87) PCT Pub. No.: WO2016/178515
PCT Pub. Date: Nov. 10, 2016

(65) Prior Publication Data
US 2018/0279242 A1    Sep. 27, 2018

(30) Foreign Application Priority Data
May 6, 2015    (KR) .................. 10-2015-0063320

(51) Int. Cl.
*H04J 3/06*    (2006.01)
*H04W 56/00*    (2009.01)
(Continued)

(52) U.S. Cl.
CPC ......... *H04W 56/002* (2013.01); *H04L 5/0048* (2013.01); *H04W 24/08* (2013.01)

(58) Field of Classification Search
CPC ..................... G03F 7/70633; G03F 7/7015
(Continued)

(56) References Cited

U.S. PATENT DOCUMENTS

2008/0013636 A1* 1/2008 Wang .................... H04L 1/0045
375/259
2010/0080192 A1* 4/2010 Dong ................. H04B 1/70735
370/332

(Continued)

FOREIGN PATENT DOCUMENTS

EP    3232728 A1    10/2017
JP    2008-148201 A    6/2008
(Continued)

OTHER PUBLICATIONS

LG Electronics, "Discussion on Synchronization and Discovery Enhancement for UE-to-Network Relay", (R1-151508), Apr. 11, 2015. (From Applicant's IDS filed on Nov. 2, 2017.) (Year: 2015).*
(Continued)

*Primary Examiner* — Mang Hang Yeung
(74) *Attorney, Agent, or Firm* — Jefferson IP Law, LLP (57) ABSTRACT

The present disclosure relates to a communication technique for converging IoT technology and a 5G communication system for supporting higher data transmission rate after a 4G system, and a system thereof. The present disclosure can be applied to an intelligent service (for example, a smart home, smart building, smart city, smart car or connected car, health care, digital education, retail business, and security and safety related service etc.) based on 5G communication technology and IoT related technology. The present invention relates to a signal receiving method and apparatus of a terminal in device-to-device wireless communication. In the present invention, a D2D reception terminal can measure a DM RS transmitted together with a PSBCH or detect energy with respect to the entirety of or a part of a symbol region (Continued)

through which the PSBCH or DM RS in a synchronization subframe can be transmitted so as to enable use as a criterion for determining whether to retry PSBCH decoding. When a DM RS measurement level or an energy detecting level is larger than a certain threshold value, the D2D reception terminal recognizes that the PSBCH has been transmitted and may retry the PSBCH decoding for a certain time or a certain number of times. When a DM RS measurement level or an energy detecting level is smaller than a certain threshold value, the D2D reception terminal recognizes that the PSBCH has not been transmitted and may not retry the PSBCH decoding. When the PSBCH decoding is not retried, the D2D reception terminal can try other PSSS/SSSS detection. Through the present invention, the D2D reception terminal can avoid inefficient operation of retrying the PSBCH decoding for a certain time or a certain number of times despite non-transmission of the PSBCH.

20 Claims, 9 Drawing Sheets

(51) Int. Cl.
*H04L 5/00* (2006.01)
*H04W 24/08* (2009.01)
(58) Field of Classification Search
USPC .......................................................... 370/350
See application file for complete search history.

(56) References Cited

U.S. PATENT DOCUMENTS

| | | |
|---|---|---|
| 2014/0099950 A1 | 4/2014 | Mildh et al. |
| 2014/0120934 A1 | 5/2014 | Kishiyama |
| 2016/0205644 A1 | 7/2016 | Seo et al. |

FOREIGN PATENT DOCUMENTS

| | | |
|---|---|---|
| WO | 2013/002206 A1 | 1/2013 |
| WO | 2013/002688 A1 | 1/2013 |
| WO | 2015/030548 A1 | 3/2015 |

OTHER PUBLICATIONS

Qualcomm, Signal Design for D2D Synchronization (R1-142964), Aug. 18-22, 2014. (From Applicant's IDS filed on Jun. 18, 2018.) (Year: 2014).*

Qualcomm Incorporated, Signal Design for D2D Synchronization, 3GPP Draft, R1-142964_QC_D2D_Sync_Signal, 3rd Generation Partnership Project (3GPP), Mobile Competence Centre, 650, Route Des Lucioles, F-06921 Sophia-Anti Polis Cedex, France, vol. RAN WG1, No. Dresden, Germany, Aug. 17, 2014 (Aug. 17, 2014), XP050788444.

LG Electronics, Measurement for D2D Synchronization, 3GPP Draft, R1-144882 Measurement for D2D Synchronization_LG, 3rd Generation Partnership Project (3GPP), Mobile Competence Centre, 650, Route Des Lucioles, F-06921 Sophia-Anti Polis Cedex, France, vol. RAN WG1, No. San Francisco, USA, Nov. 17, 2014 (Nov. 17, 2014), XP050875940.

European Search Report dated Mar. 26, 2018, issued in European Application No. 16789261.6-1220.

LG Electronics; Discussion on synchronization and discovery enhancements for UE-to-network relay; 3GPP TSG RAN WG1 Meeting #80bis; R1-151508; Apr. 20-24, 2015; Belgrade, Serbia.

Zte; Discussion on discovery enhancements; 3GPP TSG RAN WG1 Meeting #80bis; R1-151723; Apr. 20-24, 2015; Belgrade, Serbia.

Huawei et al.; Sidelink signalling design for Rel-13 discovery; 3GPP TSG RAN WG1 Meeting #80bis; R1-151874; Apr. 20-24, 2015; Belgrade, Serbia.

* cited by examiner

SIGNAL RECEIVING METHOD AND APPARATUS IN DEVICE-TO-DEVICE WIRELESS COMMUNICATION

TECHNICAL FIELD

The present invention relates to a method and an apparatus for a UE to receive a signal in D2D wireless communication.

BACKGROUND ART

In order to meet a demand for wireless data traffic that is on an increasing trend after 4G communication system commercialization, efforts for developing an improved 5G communication system or pre-5G communication system are made. For this reason, the 5G communication system or pre-5G communication system is also called a beyond 4G network communication system or a post LTE system. In order to achieve a high data transfer rate, in the 5G communication system, an implementation in an ultrahigh frequency (mmWave) band (for example, such as a 60 Giga (60 GHz) band) is taken into consideration. In order to reduce a path loss of radio waves in the mmWave band and to increase the transfer distance of radio waves, in the 5G communication system, beamforming, massive MIMO, full dimensional MIMO (FD-MIMO), array antenna, analog beam-forming, and large scale antenna technologies are being discussed. Furthermore, for the network improvement of a system, in the 5G communication system, technologies, such as an evolved small cell, an advanced small cell, a cloud radio access network (cloud RAN), an ultra-dense network, device to device communication (D2D), a wireless backhaul, a moving network, cooperative communication, coordinated multi-points (CoMP), and reception interference cancellation, are being developed. In addition, in the 5G system, hybrid FSK and QAM modulation (FQAM) and sliding window superposition coding (SWSC), that is, advanced coding modulation (ACM) schemes, and filter bank multi carrier (FBMC), non orthogonal multiple access (NOMA) and sparse code multiple access (SCMA), that is, advanced access technologies, are being developed.

Meanwhile, the Internet evolves from a human-centered connection network over which human beings generate and consume information to the Internet of Things (IoT) network over which information is exchanged between distributed elements, such as things, and processed. The Internet of Everything (IoE) technology in which a big data processing technology through a connection with a cloud server, etc. has been combined with the IoT technology is also on the rise. In order to implement the IoT, technology elements, such as a sensing technology, wired/wireless communication and network intra, a service interface technology, and a security technology, are required. Accordingly, technologies, such as a sensor network, machine to machine (M2M) and machine type communication (MTC) for a connection between things, are recently researched. In the IoT environment, an intelligent Internet technology (IT) service in which a new value is created in the human's life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and complexness between the existing information technology (IT) technology and various industries.

Accordingly, various attempts to apply the 5G communication system to the IoT network are made. For example, 5G communication technologies, such as a sensor network, machine to machine (M2M) and machine type communication (MTC), are being implemented by schemes, such as beamforming, MIMO, and an array antenna. To apply a cloud radio access network (cloud RAN) as the aforementioned big-data processing technology may be said to be an example of the convergence of the 5G technology and the IoT technology.

DISCLOSURE OF INVENTION

Technical Problem

A D2D communication UE located out of a network service area may detect a primary sidelink synchronization signal (PSSS) and secondary sidelink synchronization signal (SSSS) transmitted by a D2D UE within a neighboring network service area, may decode a PSBCH associated with a synchronization identifier including the corresponding PSSS/SSSS, and may select a synchronization reference. However, as described above, a D2D communication UE transmits a PSSS/SSSS and a PSBCH and a DM RS in the same subframe, but a D2D discovery UE does not transmit a PSBCH and a DM RS when transmitting a PSSS/SSSS.

Accordingly, if a D2D communication UE located out of a network service area detects a PSSS/SSSS from a D2D discovery UE, it will fail in PSBCH decoding. Furthermore, the corresponding D2D communication UE is not aware of whether the currently detected PSSS/SSSS has been transmitted by the D2D discovery UE, and thus may reattempt the decoding of the corresponding PSBCH for a specific time or by a specific attempt number although the PSBCH has not been transmitted.

The present invention has been made in order to solve the above problems occurring in the related art, and an object of the present invention is to provide an efficient method and apparatus for a D2D UE to receive a signal.

Solution to Problem

In accordance with the present invention, a D2D reception UE may detect a PSSS/SSSS, and may determine whether it will reattempt PSBCH decoding if the decoding of the corresponding PSBCH associated with the PSSS/SSSS has failed.

In accordance with an embodiment of the present invention, the D2D reception UE may perform measurement on a DM RS transmitted along with the PSBCH as a criterion for determining whether the PSBCH decoding will be reattempted. If a DM RS measured value is greater than a specific threshold, the D2D reception UE may recognize that the PSBCH has been transmitted and reattempt PSBCH decoding for a specific time or specific times. If the DM RS measured value is smaller than the specific threshold, the D2D reception UE may recognize that a PSBCH has not been transmitted and may not reattempt PSBCH decoding. If PSBCH decoding is not reattempted, the D2D reception UE may attempt to detect another PSSS/SSSS.

In accordance with another embodiment of the present invention, the D2D reception UE may perform energy detection on the entire symbol region or some symbol region in which a PSBCH and a DM RS may be transmitted within a synchronization subframe as a criterion for determining whether the PSBCH decoding will be reattempted. If an energy detection result value is greater than a specific threshold, the reception D2D UE may recognize that the PSBCH has been transmitted and reattempt PSBCH decoding for a specific time or specific times. If the energy detection result value is smaller than the specific threshold, the D2D reception UE may recognize that a PSBCH has not been transmitted and may not reattempt PSBCH decoding. If PSBCH decoding is not reattempted, the D2D reception UE may attempt to detect another PSSS/SSSS.

In accordance with another embodiment of the present invention, the synchronization identifier of a PSSS/SSSS in which a PSBCH is determined to have been previously transmitted may be stored in the memory of the D2D reception UE, and may be used when a current PSBCH is received. For example, a D2D UE may store the synchronization identifier X of a PSSS/SSSS associated with a PSBCH if PSBCH decoding was previously successful or if it is determined that the corresponding PSBCH has been transmitted in DM RS measurement or energy detection. Thereafter, if PSBCH decoding fails, the D2D UE may determine whether the synchronization identifier of a PSSS/SSSS associated with the corresponding PSBCH is identical with the previously stored synchronization identifier X. If the synchronization identifier is identical with the X, the D2D UE may omit DM RS measurement or energy detection and reattempt PSBCH decoding. If the synchronization identifier is not identical with the X, the D2D UE may determine whether a PSBCH has been transmitted by performing DM RS measurement or energy detection, and may then reattempt PSBCH decoding or attempt to detect another PSSS/SSSS.

In accordance with another embodiment of the present invention, the synchronization identifier of a PSSS/SSSS in which a PSBCH was not previously transmitted may be stored in the memory of the D2D reception UE and then used. For example, if a D2D UE determines that a PSBCH was not previously transmitted in DM RS measurement or energy detection, it may store the synchronization identifier X of a PSSS/SSSS associated with the corresponding PSBCH. Thereafter, if PSBCH decoding fails, the D2D UE may determine whether the synchronization identifier of a PSSS/SSSS associated with the corresponding PSBCH is identical with the previously stored synchronization identifier X. If the synchronization identifier is identical with the X, the D2D UE does not perform DM RS measurement or energy detection, does not also perform a PSBCH decoding reattempt, and may directly attempt to detect another PSSS/SSSS. If the synchronization identifier is not identical with the X, the D2D UE may determine whether a PSBCH has been transmitted by performing DM RS measurement or energy detection, and may reattempt PSBCH decoding or attempt to detect another PSSS/SSSS.

In accordance with another embodiment of the present invention, the synchronization identifier of a PSSS/SSSS in which a PSBCH is determined to have been previously transmitted and the synchronization identifier of a PSSS/SSSS in which a PSBCH is determined to have not been previously transmitted may be stored in the memory of the D2D reception UE and then used when a current PSBCH is received. For example, if it is determined that PSBCH decoding was previously successful or that the PSBCH has been transmitted in DM RS measurement or energy detection, the D2D UE may store the synchronization identifier X of a PSSS/SSSS associated with the corresponding PSBCH. Furthermore, if it is determined that a PSBCH was not previously transmitted in DM RS measurement or energy detection, the D2D UE may store the synchronization identifier Y of a PSSS/SSSS associated with the corresponding PSBCH.

Thereafter, if PSBCH decoding fails, the D2D UE may determine whether the synchronization identifier of a PSSS/SSSS associated with the corresponding PSBCH is identical with the X or the Y or is not identical with both the X and the Y. If the synchronization identifier is identical with the X, the D2D UE may omit DM RS measurement or energy detection and reattempt PSBCH decoding. If the synchronization identifier is identical with the Y, the D2D UE does not perform DM RS measurement or energy detection, does not also perform a PSBCH decoding reattempt, and may directly attempt to detect another PSSS/SSSS. If the synchronization identifier is not identical with both the X and the Y, the D2D UE may determine whether a PSBCH has been transmitted by performing DM RS measurement or energy detection, and may reattempt PSBCH decoding or attempt to detect another PSSS/SSSS.

In another method, a synchronization signal sequence having a synchronization identifier determined to transmit a PSBCH may be first detected when the detection of a synchronization signal is subsequently attempted.

Finally, in the embodiments, the PSBCH reception of a D2D UE has been assumed. In another embodiment, when the decoding of a D2D data channel (physical sidelink shared channel (PSSCH)) or a D2D control channel (physical sidelink control channel (PSCCH)) or a D2D discovery channel (physical sidelink discovery channel (PSDCH)) fails, a DM RS measurement result or energy detection result may be applied in a manner similar to that described above in order to determine whether decoding will be reattempted. In this case, a DM RS may be generated based on another input parameter depending on a physical channel. For example, when a PSBCH is received, a DM RS may be generated based on a D2D synchronization signal. When a PSSCH is received, a DM RS may be generated based on an identifier included in a PSCCH. When a PSDCH or PSCCH is received, a DM RS may be generated based on an identifier of a predetermined value, for example, a constant value of 510.

In accordance with the present invention, a method for a UE to receive a signal in a D2D wireless communication system includes the steps of:

receiving a synchronization signal transmitted by another UE, determining whether decoding a broadcast channel has been successful based on the synchronization signal, and measuring the measurement level of a DM RS or the energy level of a resource region in which the broadcast channel is located if the decoding of the broadcast channel has failed. Furthermore, the method further includes the step of reattempting the decoding of the broadcast channel if the measurement level of the DM RS or the energy level is greater than a predetermined threshold.

In accordance with yet another example, a UE receiving a signal in a D2D wireless communication system includes a receiver receiving a signal and a controller performing control so that a synchronization signal transmitted by another UE is received, whether decoding a broadcast channel based on the synchronization signal has been successful is determined, and a measurement level of a DM RS or an energy level of a resource region in which the broadcast channel is located is measured if the decoding of the broadcast channel has failed. Furthermore, the controller further performs control so that the decoding of the broadcast channel is reattempted if the measurement level of the DM RS or the energy level is greater than a predetermined threshold.

Advantageous Effects of Invention

In the present invention, if a D2D UE has failed in PSBCH decoding when receiving a signal, the aforementioned solution enables the D2D UE to determine whether it will reattempt PSBCH decoding. The solution has an advantage in that it can reduce an unnecessary operation for a D2D reception UE to reattempt the decoding of a signal although the signal to be received by the D2D UE has not been transmitted by a transmission stage. Furthermore, the present invention provides an operational procedure and apparatus of a D2D UE which are necessary to obtain the effect.

MODE FOR THE INVENTION

Hereinafter, preferred embodiments of the present invention are described with reference to the accompanying drawings. Furthermore, in describing the present invention, a detailed description of related known functions or constructions will be omitted if it is deemed to make the gist of the present invention unnecessarily vague. Furthermore, terms to be described later are terms defined by taking into consideration functions in the present invention, and may be different according to the operator's intention or usage. Accordingly, the terms should be defined based on the overall contents of the specification Furthermore, in describing the embodiments of the present invention in detail, an OFDMA-based wireless communication system, in particular, the LTE standard will be a main target, but the main gist of the present invention may be slightly modified without greatly departing from the range of the present invention and applied to other communication systems having a similar technical background and channel form. This is made possible by a determination of those skilled in the art to which the present invention pertains.

Merits and characteristics of the present invention and methods for achieving the merits and characteristics will become evident from embodiments described in detail later in conjunction with the accompanying drawings. However, the present invention is not limited to the disclosed embodiments, but may be implemented in various different forms. The embodiments are provided to only complete the disclosure of the present invention and to allow a person having ordinary skill in the art to which the present invention pertains to fully understand the category of the invention. The present invention is only defined by the category of the claims. The same reference numbers are used to refer to the same elements throughout the drawings.

3rd generation partnership project (3GPP), that is, an asynchronous cellular mobile communication standard organization, has completed a standardization task so that a long term evolution (LTE) system supports not only the existing wireless communication between a BS and a UE, but wireless communication between UEs or devices, that is, device-to-device (D2D) communication.

One of major functions supported in D2D communication is communication for providing a public safety (PS) service. The PS service must be able to support LTE-based wireless communication of public safety-related groups, such as a police officer, a firefighter or government personnel, if it is impossible to provide normal services of a network due to a natural disaster and emergence.

In general, in a wireless communication system, in order to perform smooth communication, it is necessary to obtain a timing reference to be used for the signal transmission/reception of UEs within the system, that is, synchronization. If a network service normally operates in the LTE system, UEs within a BS service area may obtain synchronization by receiving a primary synchronization signal/secondary synchronization signal (PSS/SSS) transmitted by a BS in the downlink. In the case of D2D communication, as described above, it is impossible to provide a normal service over a network. Accordingly, the PS service can be supported by providing other means capable of obtaining synchronization in the situation in which a UE cannot obtain synchronization by receiving a PSS/SSS from a BS.

One of other major functions supported in D2D communication is discovery (may be hereinafter interchangeably used with scan) for a commercial purpose. For example, a transmission UE notifies surroundings of its presence by transmitting a scan signal, and a reception UE may be aware of information indicating that which UE is present on the periphery by receiving the scan signal. If an SNS friend is nearby, a discovery function may be used for a service that notifies a user of the presence of the SNS friend or provides information indicating that which restaurant is nearby. However, D2D discovery is supported only within a BS service area.

In D2D communication, synchronization acquisition means may be provided to a UE not belonging to a BS service area using a D2D synchronization signal different from a PSS/SSS, that is, an existing LTE cellular synchronization signal. The D2D synchronization signal includes two synchronization signals. The two synchronization signals are defined as a primary sidelink synchronization signal (PSSS) and a secondary sidelink synchronization signal (SSSS) (hereinafter a PSSS and an SSSS, a PSSS/SSSS), respectively. In this case, like a PSS and SSS transmitted by a BS in the LTE cellular system, each of the PSSS and SSSS includes Zadoff-Chu (ZC) and an m-sequence. The center 6 resource block (RB) frequency resources of a subframe for synchronization transmission/reception present in a cycle of 40 ms in terms of time may be used as resources in which the PSSS/SSSS are transmitted. In the case of a normal subframe, the PSSS is contiguously transmitted in second and third SC-FDMA symbols, and the SSSS is contiguously transmitted twelfth and thirteenth SC-FDMA symbols. The PSSS/SSSS synchronization signal may be transmitted by a D2D UE and may be used for communication for the PS service and discovery for a commercial purpose.

In the case of communication, a subframe in which a PSSS/SSSS may be transmitted is determined by the configuration of a BS or a predetermined configuration. If the configuration by a BS is applied, it corresponds to a case where a synchronization reference is provided to D2D UEs out of a neighboring network service area in such a manner that a D2D UE within the network service area transmits a PSSS/SSSS using the BS as the synchronization reference. If the predetermined configuration is used, it corresponds to a case where a D2D UE out of a network service area becomes a synchronization reference. The reason for this is that the D2D UE cannot normally receive a network service.

In this case, a communication UE may transmit a physical sidelink broadcast channel (PSBCH), including D2D system-related information, in a PSSS/SSSS transmission subframe along with a demodulation reference signal (DM RS). Like the PSSS/SSSS, both the PSBCH and the DM RS may use the center 6 RB frequency resources of the subframe for synchronization transmission/reception. The PSBCH may include a D2D subframe index for D2D direct communication, a time division duplex (TDD) uplink/downlink configuration, a D2D direct communication system bandwidth, an indicator indicating whether a corresponding PSBCH transmission UE is located within a cellular service area, and so on. A synchronization identifier (may be hereinafter interchangeably used with a synchronization ID, a sync ID) included in the PSSS/SSSS is used for the initialization of the generation of a scrambling sequence and the generation of a DM RS sequence for the PSBCH.

For example, a UE out of a cellular service area which has received a PSSS/SSSS and PSBCH transmitted by a UE within the cellular area may receive D2D-related configuration information within the cellular service area through the PSBCH, thereby enabling communication between the UE within the cellular area and the UE out of the cellular area. Furthermore, in the case of communication between UEs out of the cellular area, since there is no BS that provides notification of D2D system-related information, communication between the UEs is made possible in such a manner that each UE checks D2D system-related information through a PSBCH.

However, if a UE supporting only discovery transmits a PSSS/SSSS, a PSBCH and a DM RS are not transmitted together. The reason for this is that since discovery is supported only within a BS service area as described above, information within a PSBCH is not separately necessary because D2D-related basic information can be received from system information of a BS.

In LTE, a frequency domain resource allocation unit is a physical resource block (PRB), includes 12 contiguous subcarriers of a 15 kHz interval, and has a size of 180 kHz. Furthermore, a time domain resource allocation unit is a subframe of 1 ms in length, and 10 subframes gather to form one radio frame. Furthermore, the one radio frame corresponds to one system frame number (SFN). Finally, one subframe includes two slots ($0^{th}$ slot and $1^{st}$ slot), each one having a length of 0.5 ms. In the case of a normal subframe, each slot includes 7 orthogonal frequency division multiplex (OFDM) symbols in the case of the downlink and includes 7 single carrier frequency division multiple access (SC-FDMA) symbols in the case of the uplink.

Hereinafter, in the present invention, a reception method, procedure and operation method used for the signal reception of a D2D UE will be described.

Figure 1:
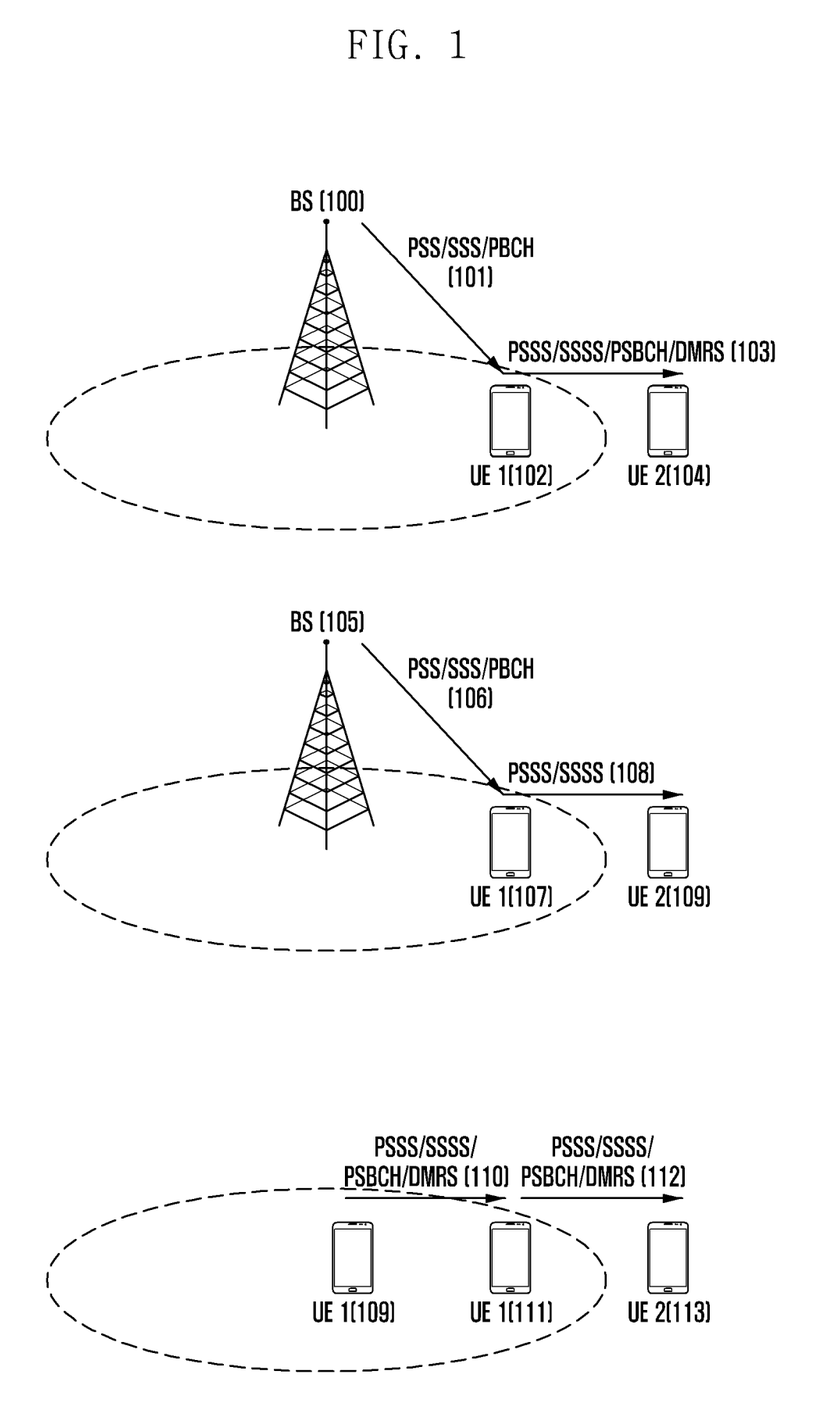
FIG. 1 is a diagram showing an example of a D2D synchronization process in a wireless communication system of the present invention.

FIG. 1 is a diagram showing an example of a D2D synchronization process in a wireless communication system of the present invention.

Referring to FIG. 1, a first case shows an example of partial coverage. In this case, a BS 100 (may be hereinafter interchangeably used with a base station, BS) is present. The corresponding BS 100 may transmit a PSS/SSS and a physical broadcast channel (PBCH) 101 in the downlink in order to provide a synchronization reference and system information to UEs belonging to its own service area. Assuming that a D2D UE UE1 102 belonging to the service area of the BS 100 is present, the UE1 102 may obtain synchronization through PSS/SSS detection in the PSS/SSS and PBCH 101, and may then obtain the system information by decoding the PBCH based on the synchronization. The system information may include basic system information necessary for LTE cellular communication, such as a downlink system bandwidth, an SFN, HARQ acknowledgement for uplink data and an ACK/NACK resource configuration.

If the UE1 102 is a UE supporting D2D communication, the UE1 102 may transmit a PSSS/SSSS/PSBCH/DM RS 103 necessary to enable D2D communication with another D2D UE out of the service area of the BS 100 in accordance with synchronization reference timing provided by the BS 100. In this case, whether the PSSS/SSSS/PSBCH/DM RS 103 will be transmitted may be configured by the BS 100, and a synchronization identifier included in the transmitted PSSS/SSSS may also be configured by the BS 100. If the UE1 102 is a UE in an idle state in which whether the PSSS/SSSS/PSBCH/DM RS 103 will be transmitted has not been configured by the BS 100, the UE1 102 may transmit the PSSS/SSSS/PSBCH/DM RS 103 if a reference signal received power (RSRP) level measured by the BS 100 is smaller than a threshold set in the system information of the BS 100.

A UE2 104, that is, a D2D communication UE out of the service area of the BS 100, may perform synchronization through PSSS/SSSS detection from the PSSS/SSSS/PSBCH/DM RS 103 received from the UE1 102, and may check basic information necessary for D2D communication, such as whether a UE that has transmitted a D2D subframe index, a TDD uplink/downlink configuration, a D2D communication system bandwidth and a corresponding PSBCH for D2D communication is located within the cellular service area by decoding the PSBCH using the DM RS. Thereafter, the two UEs, the UE1 102 and the UE2 104, may perform transmission/reception for D2D communication based on the synchronization reference timing provided by the BS 100 and the basic information necessary for D2D communication.

In the aforementioned situation, a UE that has decoded the PSBCH, that is, the UE2 104, may use the information included in the PSBCH as follows. First, the PSBCH reception UE may check the index of a subframe in which the PSBCH has now been received from D2D subframe index information. For example, resources in which a D2D synchronization signal or communication data is transmitted may be configured to be located behind by a predetermined offset from the D2D subframe index No. 0 of a synchronization reference UE. Accordingly, if information regarding that a current PSBCH is transmitted in which D2D subframe index is shared by the reception UE, the UE may be aware that D2D resources will be present after some subframes from the subframe in which the current PSBCH has been received, and may perform the reception or transmission of a D2D synchronization signal or discovery message in time when corresponding D2D resources are present.

Second, the PSBCH reception UE may check the location of an uplink subframe based on current TDD uplink/downlink configuration information. In D2D communication, transmission/reception is performed using uplink resources. Accordingly, a UE may perform D2D signal reception on only uplink subframes or D2D signal transmission, if necessary. If a UE is unaware of corresponding information and arbitrarily transmits/receives a D2D signal, a problem in that a UE in a neighboring cellular service area experiences interference attributable to the D2D signal when it performs downlink reception may be generated.

D2D system bandwidth information is also information essential for the transmission/reception of a D2D signal between UEs. Finally, 1-bit information providing notification whether a UE that has transmitted a PSBCH is located within a cellular service area may be used as information for determining, by a UE that has received a PSSS/SSSS/PSBCH, priority for selecting a synchronization reference. A UE within a cellular service area has higher priority than a UE out of the cellular service area.

A second case is another example of partial coverage and is different from the first case in that a D2D UE within a BS service is a UE supporting only D2D discovery. In this case, a BS 105 is present. The corresponding BS 105 may transmit a PSS/SSS and PBCH 106 in the downlink in order to provide a synchronization reference and system information to UEs within its service area. Assuming that a D2D discovery UE UE1 107 belonging to the service area of the BS 105 is present, the UE1 107 may obtain synchronization through PSS/SSS detection in the PSS/SSS and PBCH 106, and may obtain system information by decoding the PBCH based on the synchronization.

The UE1 107 is a UE supporting only D2D discovery, and thus the UE1 107 may transmit only a PSSS/SSSS 108 necessary to enable D2D communication with another D2D UE out of the service area of the BS 105 according to synchronization reference timing provided by the BS 105. In this case, whether the PSSS/SSSS will be transmitted may be configured by the BS 105, and a synchronization identifier included in the transmitted PSSS/SSSS may also be configured by the BS 105. A UE in the idle state for which whether the PSSS/SSSS will be transmitted has not been configured by the BS 105 may transmit the PSSS/SSSS 108 when an RSRP level measured from the BS 105 is smaller than a threshold set in the system information of the BS 105.

A UE2 109, that is, a D2D communication UE out of the service area of the BS 105, may be synchronized through PSSS/SSSS detection from the PSSS/SSSS 108 received from the UE1 107. However, since a PSBCH has not been transmitted, the UE2 109 inevitably fails in PSBCH decoding and may attempt detection for another PSSS/SSSS only after it continues to perform PSBCH decoding for a specific time or for specific times.

A third case shows an example of out-of-coverage. It is assumed that a BS is not present and a D2D communication UE UE1 109 has autonomously become a synchronization reference because there is no nearby target that will become a target of the synchronization reference. In this case, the UE1 109 may transmit a PSSS/SSSS/PSBCH/DM RS 110 its synchronization reference timing in order to provide the synchronization reference and system information to UEs belonging to the service area of the UE1 109. In this case, a synchronization identifier included in the PSSS/SSSS may be selected by the UE1 109. A UE2 111, that is, a D2D communication UE within the service area of the UE1 109, may be synchronized through PSSS/SSSS detection from the PSSS/SSSS/PSBCH/DM RS 110 received from the UE1 109, and may check basic information for D2D communication by decoding a PSBCH using the DM RS. Thereafter, the two UEs, the UE1 109 and the UE2 111, may perform D2D communication transmission/reception based on the synchronization reference timing of the UE1 109 and the basic information necessary for D2D communication.

The UE2 111 may transmit a PSSS/SSSS/PSBCH/DM RS 112 based on the synchronization reference timing obtained from the UE1 109 and the basic information necessary for D2D communication. However, if a DM RS measurement level received from the UE1 109 along with a PSBCH is lower than a predetermined threshold, the PSSS/SSSS/PSBCH/DM RS 112 may be transmitted. A synchronization identifier included in the transmitted PSSS/SSSS may also be configured by the BS 100. This may be received by a UE3 113, that is, yet another the D2D communication UE out of the service area of the UE1 109, thereby enabling the execution of D2D communication through a process, such as that described above.

Figure 2:
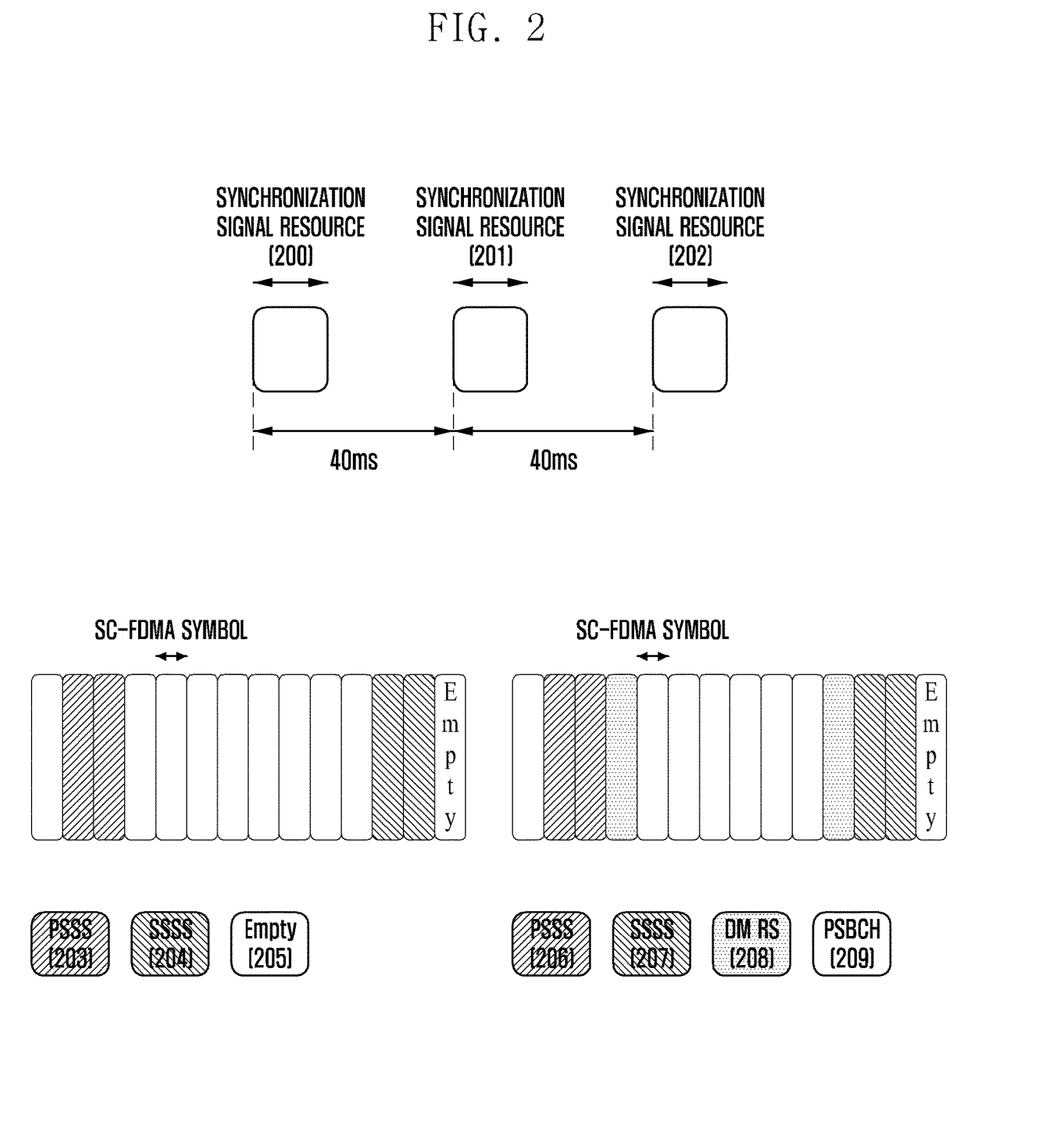
FIG. 2 is a diagram showing the structure of physical layer resources for the transmission/reception of a signal related to D2D synchronization in a wireless communication system of the present invention.

FIG. 2 is a diagram showing the structure of physical layer resources for the transmission/reception of a signal related to D2D synchronization in a wireless communication system of the present invention.

Referring to FIG. 2, subframes 200, 201 and 202 in which a PSSS/SSSS is transmitted/received may be present at intervals of 40 ms as synchronization signal resources configured for D2D communication. Furthermore, if the PSSS/SSSS transmission/reception subframe configured to D2D communication collides against another D2D transmission/reception signal resource, PSSS/SSSS transmission/reception may be first performed.

A signal transmitted in one PSSS/SSSS transmission/reception subframe may be different depending on whether a PSSS/SSSS transmission D2D UE supports communication or supports only discovery. If a normal cyclic prefix (CP) is assumed, a UE supporting only D2D discovery transmits a PSSS 203 and an SSS 204 as shown and other SC-FDMA symbols are not used as in (205). In contrast, if a normal CP is assumed, a UE supporting D2D communication transmits a DM RS 208 and a PSBCH 209 in addition to a PSSS 206 and an SSS 207. In either case, the last SC-FDMA symbol within a subframe is not used and is empty and used as a gap symbol. Accordingly, the PSBCH and the DM RS may be transmitted or may not be transmitted in a synchronization transmission/reception subframe depending on a service of a D2D UE supportable by a transmission UE. Accordingly, from a viewpoint of a reception UE, there is uncertainty in PSBCH transmission.

Figure 3:
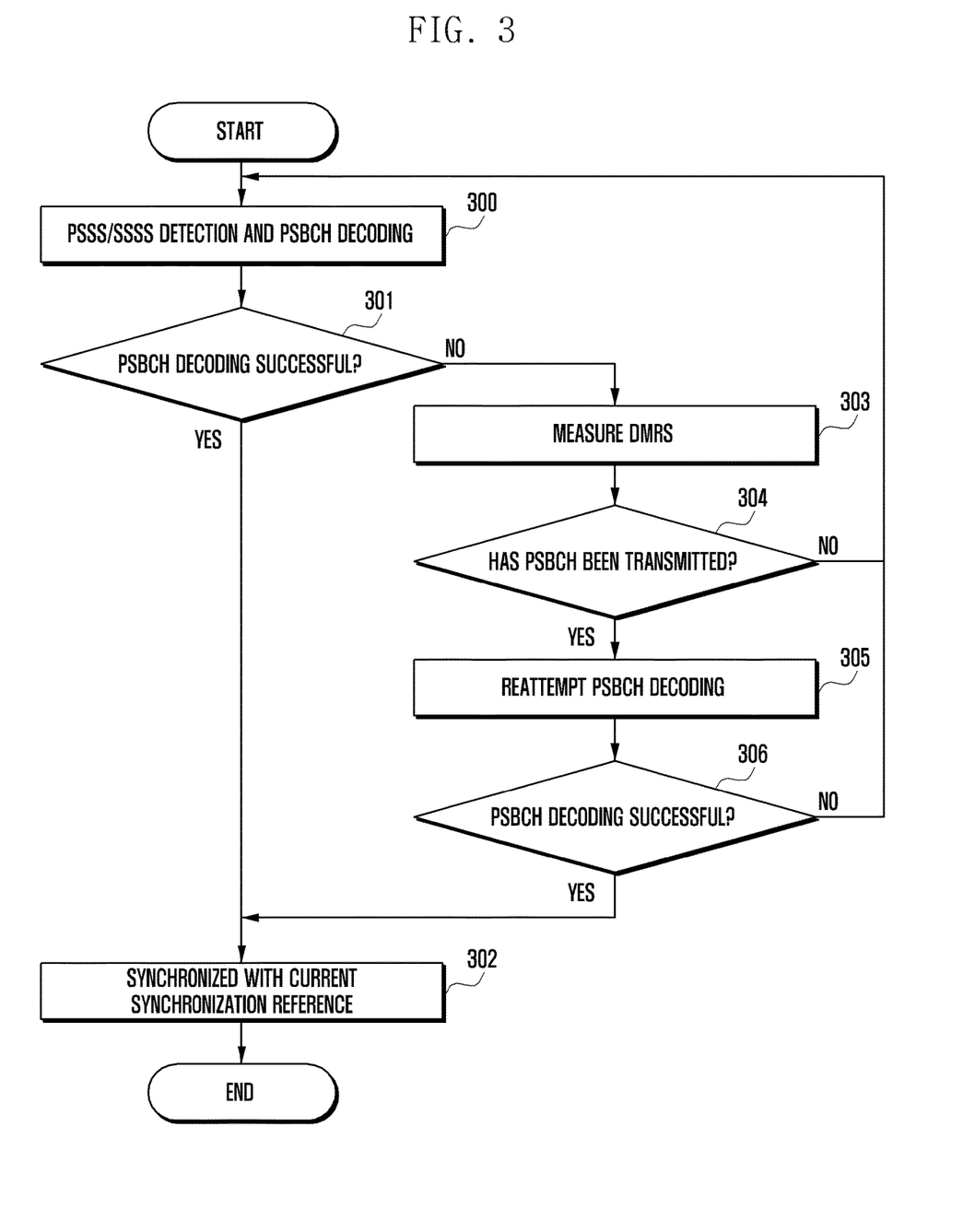
FIG. 3 is a diagram showing an operation of a D2D reception UE in an embodiment of the present invention.

FIG. 3 is a diagram showing an operation of a D2D reception UE in an embodiment of the present invention.

Referring to FIG. 3, at step 300, a D2D communication UE may obtain synchronization and a synchronization identifier by detecting a PSSS/SSSS, and may then perform channel estimation and PSBCH decoding using an associated DM RS. Thereafter, the D2D communication UE may proceed to step 301 and determine whether the PSBCH decoding has been successfully performed. The corresponding determination may be performed using a cyclic redundancy check (CRC) inserted into a PSBCH code block. If it is determined that successful PSBCH decoding has been performed, the UE may proceed to step 302 and select a corresponding PSSS/SSSS/PSBCH transmission UE as a synchronization reference or synchronization source.

If it is determined that the PSBCH decoding has not been successfully performed at step 301, the UE may proceed to step 303 and perform measurement on the currently received DM RS. The measurement is to measure a degree of correlation by measuring a correlation with a sequence received by the UE by generating a DM RS sequence based on the synchronization identifier obtained from the PSSS/SSSS. Furthermore, the UE may proceed to step 304 and determine whether a PSBCH has been transmitted depending on whether a DM RS measurement level is greater than or smaller than a predetermined threshold. In this case, if the DM RS measurement level is smaller than the threshold, the UE may determine that the PSBCH has not been transmitted. If the DM RS measurement level is greater than the threshold, the UE may determine that the PSBCH has been transmitted. If it is determined that the PSBCH has not been transmitted, the UE may proceed to step 300 and attempt to detect another PSSS/SSSS. If it is determined that that the PSBCH has been transmitted, the UE may proceed to step 305 and reattempt the PSBCH decoding when next PSSS/SSSS resources are received. In this case, the PSBCH decoding reattempt may be performed for a specific time or when specific PSSS/SSSS resources are received or for a specific number of times that PSBCH decoding is reattempted. Thereafter, the UE that has proceeded to step 306 may determine whether the PSBCH decoding has been successfully performed. If it is determined that the PSBCH decoding is not successful, the UE may proceed to step 300 and attempt to detect another PSSS/SSSS. If it is determined that the PSBCH decoding is successful, the UE may proceed to step 302 and select a corresponding PSSS/SSSS/PSBCH transmission UE as a synchronization reference or synchronization source.

Figure 4:
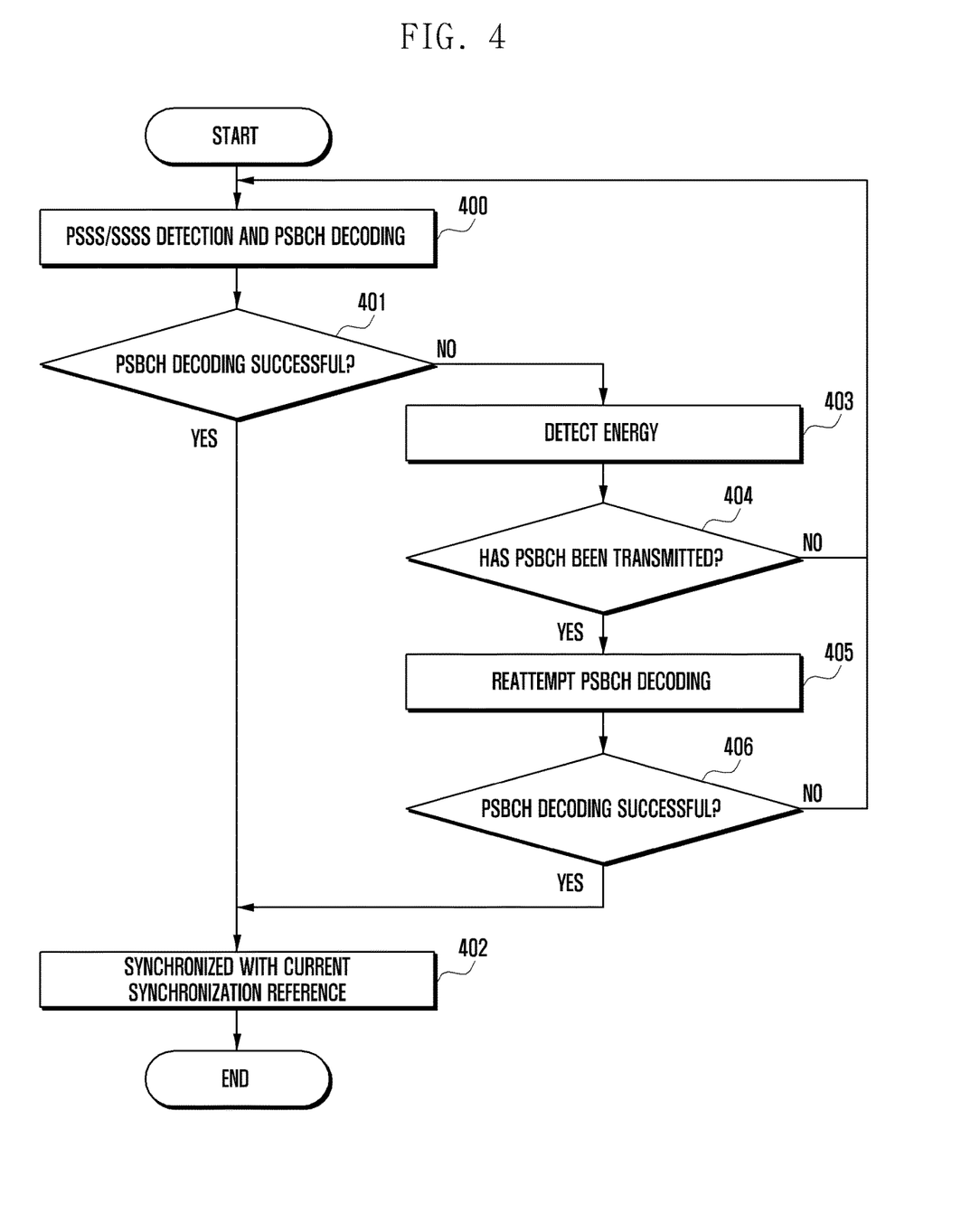
FIG. 4 is a diagram showing an operation of a D2D reception UE in another embodiment of the present invention.

FIG. 4 is a diagram showing an operation of a D2D reception UE in another embodiment of the present invention.

Referring to FIG. 4, at step 400, the D2D communication UE may obtain synchronization and a synchronization identifier by detecting a PSSS/SSSS, and may then perform channel estimation and PSBCH decoding using an associated DM RS. Thereafter, the D2D communication UE may proceed to step 401 and determine whether the PSBCH decoding has been successfully performed. The corresponding determination may be performed using a CRC inserted into a PSBCH code block. If it is determined that successful PSBCH decoding has been performed, the UE may proceed to step 402 and select a corresponding PSSS/SSSS/PSBCH transmission UE as a synchronization reference or synchronization source.

If it is determined that the PSBCH decoding has not been successfully performed at step 401, the UE may proceed to step 403 and perform energy detection on the remaining symbols other than the PSSS/SSSS transmission symbol of a currently received subframe or some of the excluded symbols. Furthermore, the UE may proceed to step 404 and determine whether a PSBCH has been transmitted depending on whether an energy detection level is greater than or smaller than a predetermined threshold. In this case, if the energy detection level is smaller than the threshold, the UE may determine that the PSBCH has not been transmitted. If the energy detection level is greater than the threshold, the UE may determine that the PSBCH has been transmitted. If it is determined that the PSBCH has not been transmitted, the UE may proceed to step 400 and attempt to detect another PSSS/SSSS. If it is determined that that the PSBCH has been transmitted, the UE may proceed to step 405 and reattempt the PSBCH decoding when next PSSS/SSSS resources are received. In this case, the PSBCH decoding reattempt may be performed for a specific time or when specific PSSS/SSSS resources are received or for a specific number of times that PSBCH decoding is reattempted. Thereafter, the UE that has proceeded to step 406 may determine whether the PSBCH decoding has been successfully performed. If it is determined that the PSBCH decoding is not successful, the UE may proceed to step 400 and attempt to detect another PSSS/SSSS. If it is determined that the PSBCH decoding is successful, the UE may proceed to step 402 and select a corresponding PSSS/SSSS/PSBCH transmission UE as a synchronization reference or synchronization source.

Figure 5:
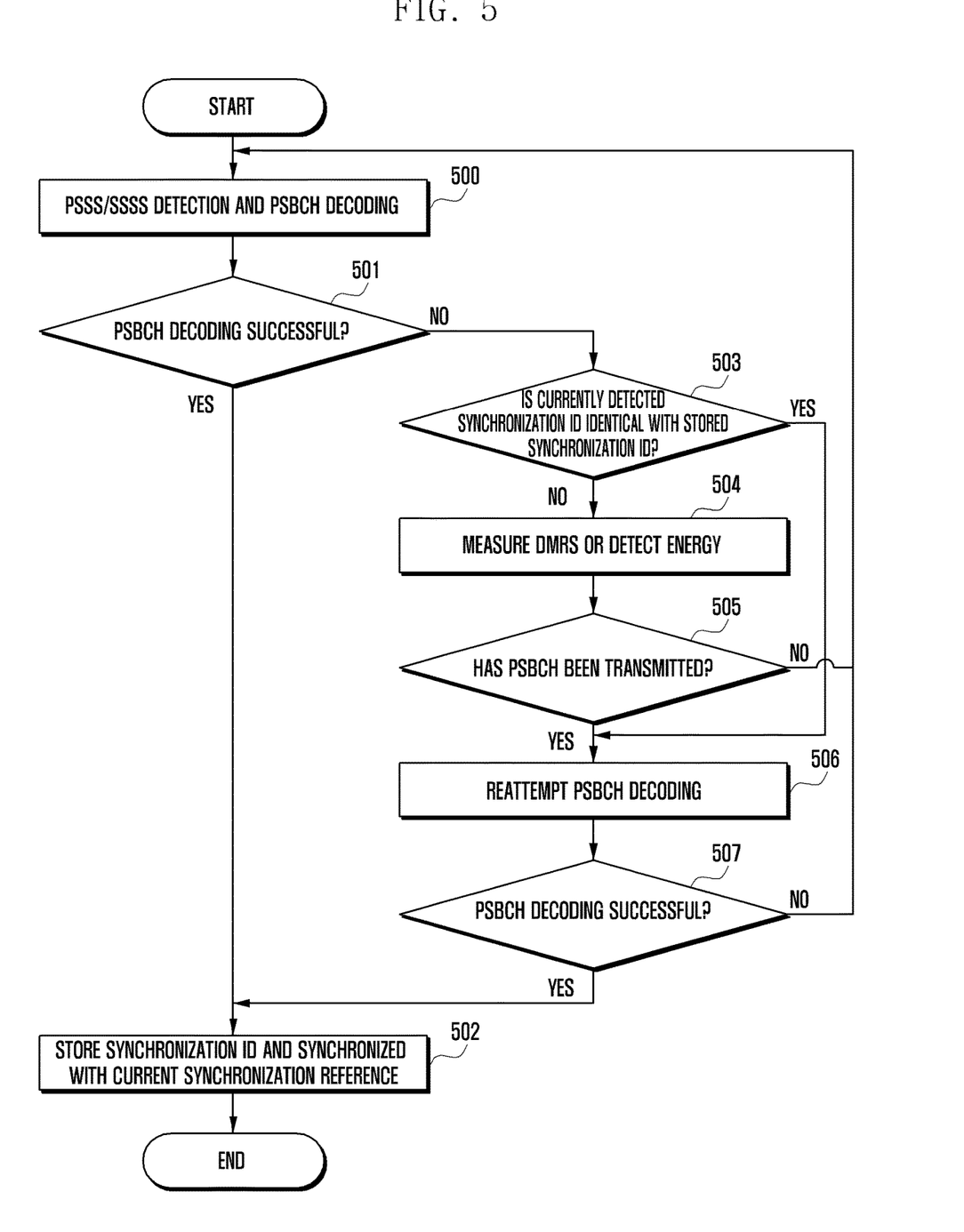
FIG. 5 is a diagram showing an operation of a D2D reception UE in yet another embodiment of the present invention.

FIG. 5 is a diagram showing an operation of a D2D reception UE in yet another embodiment of the present invention.

Referring to FIG. 5, it is assumed that the UE has stored the synchronization identifier of a PSSS/SSSS on which PSBCH decoding has been successful in the past in its memory. At step 500, the D2D communication UE may obtain synchronization and a synchronization identifier by detecting a PS SS/SSSS, and may then perform channel estimation and PSBCH decoding using an associated DM RS. Thereafter, the D2D communication UE may proceed to step 501 and determine whether the PSBCH decoding has been successfully performed. The corresponding determination may be performed using a CRC inserted into a PSBCH code block. If it is determined that successful PSBCH decoding has been performed, the UE may proceed to step 502, may store synchronization identifier indicated by the corresponding PSSS/SSSS in its memory, and may select a corresponding PSSS/SSSS/PSBCH transmission UE as a synchronization reference or synchronization source.

If it is determined that the PSBCH decoding has not been successfully performed at step 501, the UE proceeds to step 503 and determines whether the synchronization identifier indicated by the currently detected PSSS/SSSS is identical with the synchronization identifier on which PSBCH decoding was successful in the past. If it is determined that the synchronization identifier indicated by the currently detected PSSS/SSSS is not identical with the synchronization identifier on which PSBCH decoding was successful in the past at step 503, the UE may proceed to step 504, and may perform measurement on the currently received DM RS or perform energy detection on the remaining symbols other than the PSSS/SSSS transmission symbol of a currently received subframe or some of the excluded symbols. Furthermore, the UE may proceed to step 505 and determine whether a PSBCH has been transmitted depending on whether a DM RS measurement level or energy detection level is greater than or smaller than a predetermined threshold. In this case, if the level is smaller than the threshold, the UE may determine that the PSBCH has not been transmitted. If the level is greater than the threshold, the UE may determine that the PSBCH has been transmitted.

If it is determined that the PSBCH has not been transmitted, the UE may proceed to step 500 and attempt to detect another PSSS/SSSS. If it is determined that the PSBCH has been transmitted, the UE may proceed to step 506 and reattempt PSBCH decoding when next PSSS/SSSS resources are received. In this case, the PSBCH decoding reattempt may be performed for a specific time or when specific PSSS/SSSS resources are received or for a specific number of times that PSBCH decoding is reattempted. Thereafter, the UE that has proceeded to step 507 may determine whether the PSBCH decoding has been successfully performed. If it is determined that the PSBCH decoding is not successful, the UE may proceed to step 500 and attempt to detect another PSSS/SSSS. If it is determined that the PSBCH decoding is successful, the UE may proceed to step 502 and select a corresponding PSSS/SSSS/PSBCH transmission UE as a synchronization reference or synchronization source.

If it is determined that a synchronization identifier indicated by the currently detected PSSS/SSSS is identical with the synchronization identifier on which PSBCH decoding was successful in the past at step 503, the UE may proceed to step 506 and reattempt PSBCH decoding when next PSSS/SSSS resources are received. In this case, the PSBCH decoding reattempt may be performed for a specific time or when specific PSSS/SSSS resources are received or for a specific number of times that PSBCH decoding is reattempted. Thereafter, the UE that has proceeded to step 507 may determine whether the PSBCH decoding has been successfully performed. If it is determined that the PSBCH decoding is not successful, the UE may proceed to step 500 and attempt to detect another PSSS/SSSS. If it is determined that the PSBCH decoding is successful, the UE may proceed to step 502, may store a synchronization identifier indicated by the corresponding PSSS/SSSS in its memory, and may select a corresponding PSSS/SSSS/PSBCH transmission UE as a synchronization reference or synchronization source.

Figure 6:
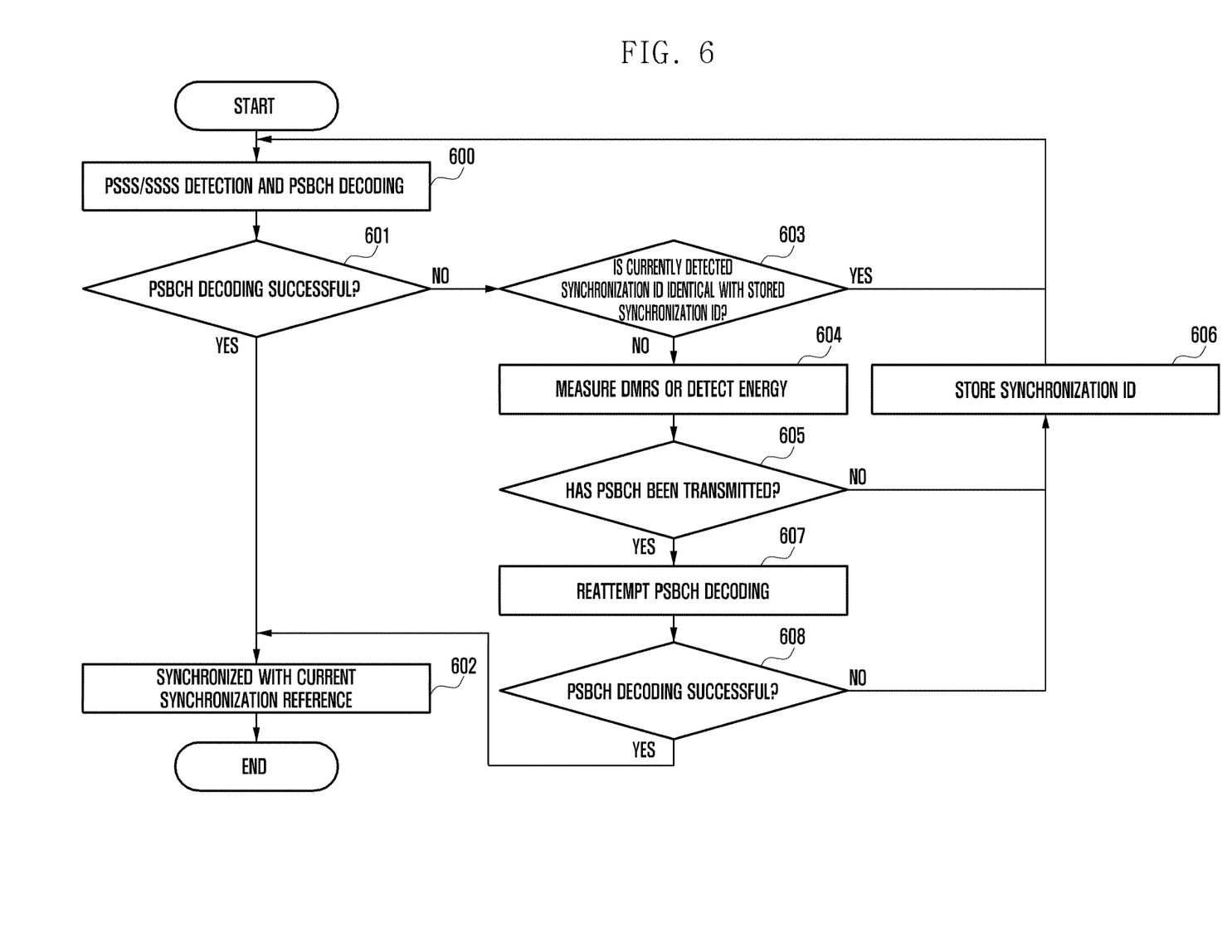
FIG. 6 is a diagram showing an operation of a D2D reception UE in yet another embodiment of the present invention.

FIG. 6 is a diagram showing an operation of a D2D reception UE in yet another embodiment of the present invention.

Referring to FIG. 6, it is assumed that the UE has stored the synchronization identifier of a PSSS/SSSS in which a PSBCH was not transmitted in the past in its memory. At step 600, the D2D communication UE may obtain synchronization and a synchronization identifier by detecting a PSSS/SSSS, and may then perform channel estimation and PSBCH decoding using an associated DM RS. Thereafter, the D2D communication UE may proceed to step 601 and determine whether the PSBCH decoding has been successfully performed. The corresponding determination may be performed using a CRC inserted into a PSBCH code block. If it is determined that successful PSBCH decoding has been performed, the UE may proceed to step 602 and select a corresponding PSSS/SSSS/PSBCH transmission UE as a synchronization reference or synchronization source.

If it is determined that the PSBCH decoding has not been successfully performed at step 601, the UE proceeds to step 603 and determines whether the synchronization identifier indicated by the currently detected PSSS/SSSS is identical with the synchronization identifier in which a PSBCH was not transmitted in the past.

If it is determined that the synchronization identifier indicated by the currently detected PSSS/SSSS is identical with the synchronization identifier in which a PSBCH was not transmitted in the past at step 603, the UE may proceed to step 600 and perform another PSSS/SSSS detection.

If it is determined that the synchronization identifier indicated by the currently detected PSSS/SSSS is not identical with the synchronization identifier in which a PSBCH was not transmitted in the past at step 603, the UE may proceeds to step 604 and may perform measurement on the currently received DM RS measurement or perform energy detection on the remaining symbols other than the PSSS/SSSS transmission symbol of a currently received subframe or some of the excluded symbols. Furthermore, the UE may proceed to step 605 and determine whether a PSBCH has been transmitted depending on whether a DM RS measurement level or energy detection level is greater than or smaller than a predetermined threshold. In this case, if the level is smaller than the threshold, the UE may determine that the PSBCH has not been transmitted. If the level is greater than the threshold, the UE may determine that the PSBCH has been transmitted. If it is determined that the PSBCH has not been transmitted at step 605, the UE may proceed to step 606 and store the synchronization identifier indicated by the corresponding PSSS/SSSS in its memory. Thereafter, the UE may proceed to step 600 and attempt to detect another PSSS/SSSS.

If it is determined that the PSBCH has been transmitted at step 605, the UE may proceed to step 607 and reattempt PSBCH decoding when next PSSS/SSSS resources are received. In this case, the PSBCH decoding reattempt may be performed for a specific time or when specific PSSS/SSSS resources are received or for a specific number of times that PSBCH decoding is reattempted. Thereafter, the UE that has proceeded to step 608 may determine whether the PSBCH decoding has been successfully performed. If it is determined that the PSBCH decoding is not successful, the UE may proceed to step 606 and store the synchronization identifier indicated by the corresponding PSSS/SSSS in its memory. Thereafter, the UE may proceed to step 600 and attempt to detect another PSSS/SSSS. If it is determined that the PSBCH decoding is successful, the UE may proceed to step 602 and select a corresponding PSSS/SSSS/PSBCH transmission UE as a synchronization reference or synchronization source.

Figure 7:
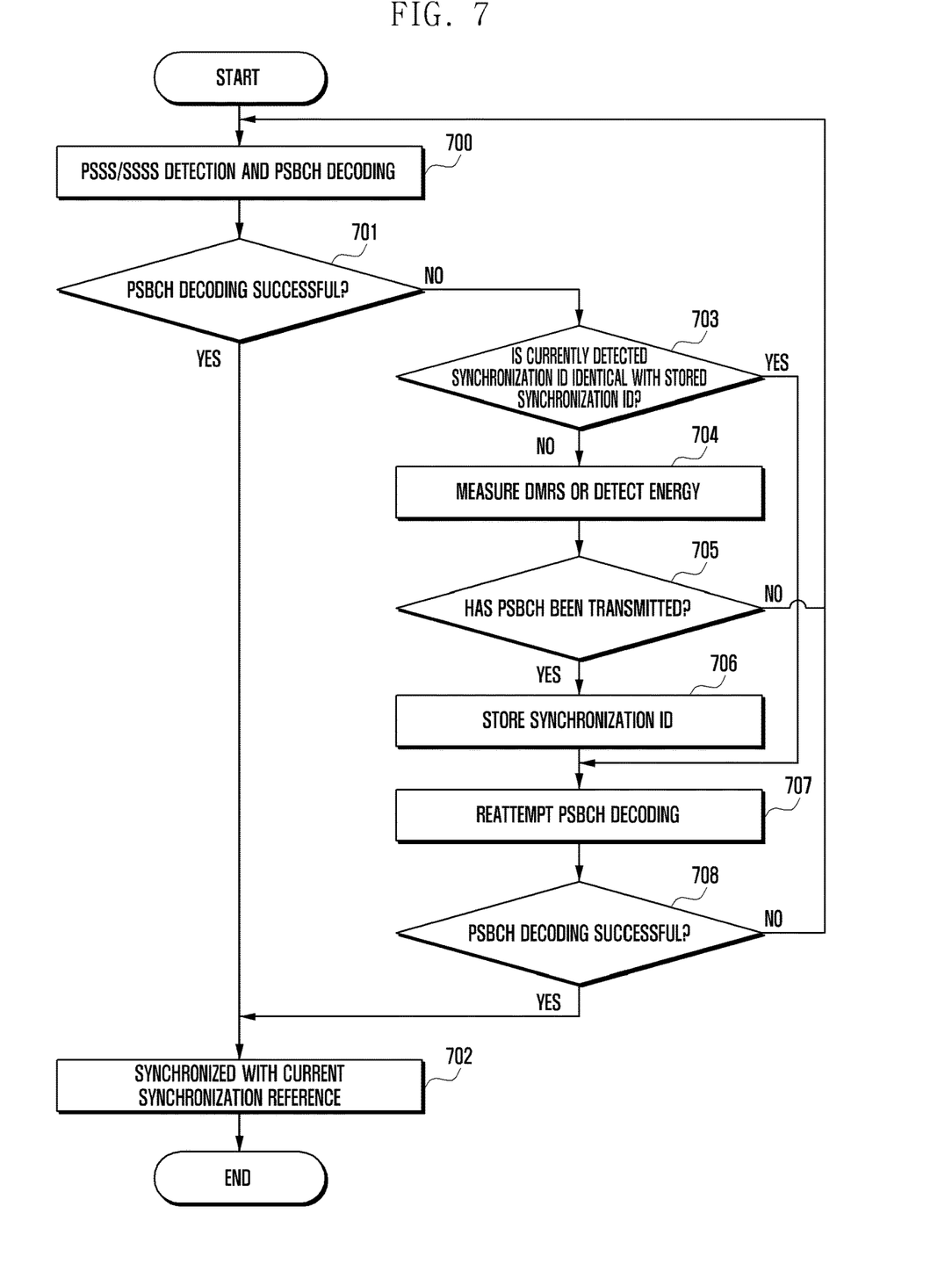
FIG. 7 is a diagram showing an operation of a D2D reception UE in yet another embodiment of the present invention.

FIG. 7 is a diagram showing an operation of a D2D reception UE in yet another embodiment of the present invention.

Referring to FIG. 7, a basic assumption and the operation of the UE are similar to those of the embodiment of FIG. 5, and thus a detailed description thereof is omitted. In the case of FIG. 5, however, the UE has stored a synchronization identifier indicated by a PSSS/SSSS associated with a PSBCH when PSBCH decoding is successful in its memory, and the present embodiment is different from the embodiment of FIG. 5 in that the UE stores a synchronization identifier indicated by a PSSS/SSSS in which it is determined that a PSBCH has been transmitted in its memory. When it is viewed on the drawing, other operations are the same in FIG. 5 and FIG. 7. In the case of FIG. 5, the synchronization identifier has been stored at step 502, but in the case of the present embodiment, an operation of storing a synchronization identifier is not present at step 702. Furthermore, in the case of FIG. 5, if it is determined that a PSBCH has been transmitted at step 505, the UE has proceeded to step 506 and performed PSBCH decoding. In the case of the present embodiment, if it is determined that a PSBCH has been transmitted at step 705, the UE proceeds to step 706, stores a synchronization identifier indicated by a corresponding PSSS/SSSS, proceeds to step 707, and reattempts PSBCH decoding.

Figure 8:
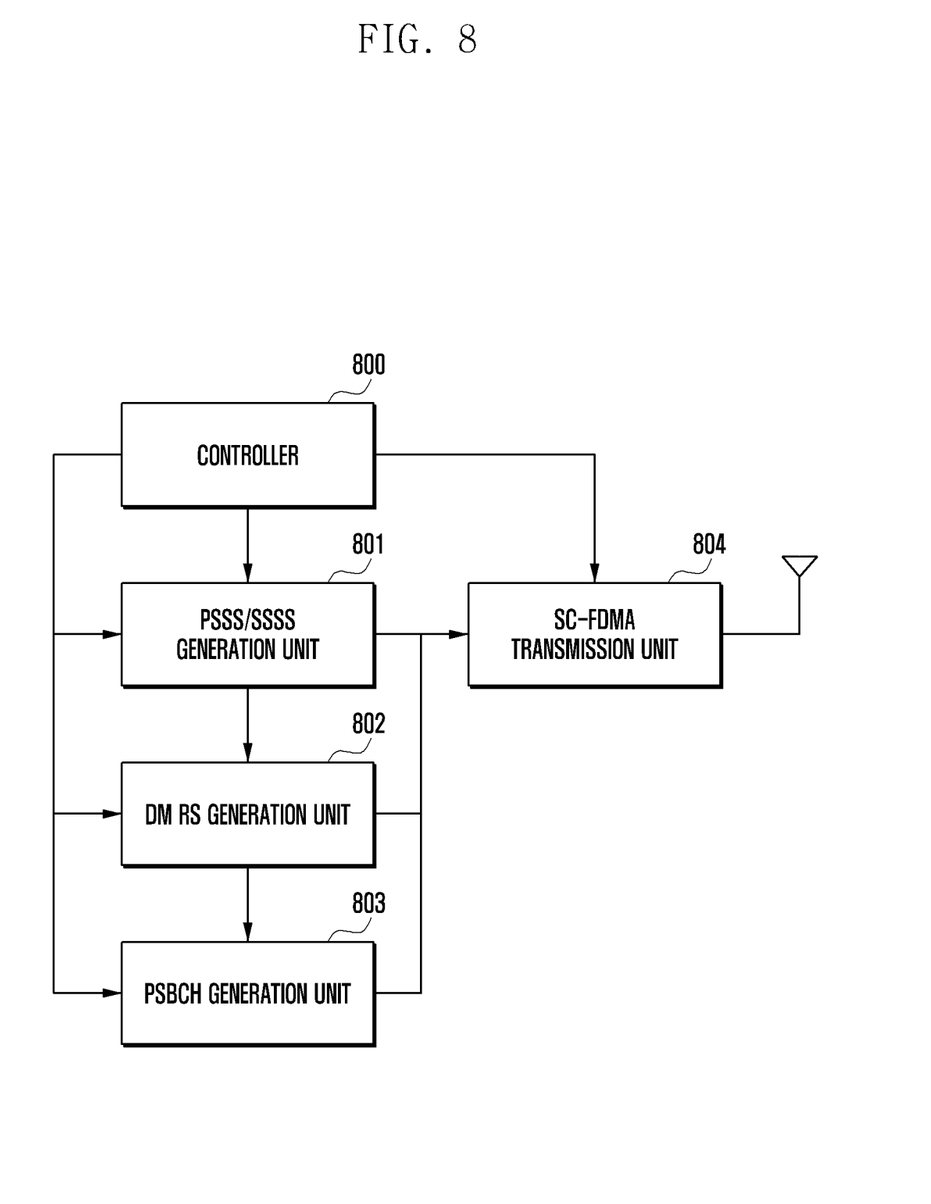
FIG. 8 is a block diagram showing a D2D UE transmitter in a wireless communication system of the present invention.

FIG. 8 is a block diagram showing a D2D UE transmitter in a wireless communication system of the present invention.

Referring to FIG. 8, the transmission stage may include a controller 800, a PSSS/SSSS signal generation unit 801, a DM RS generation unit 802, a PSBCH generation unit 803, and an SC-FDMA transmission unit 804.

The controller 800 may control the PSSS/SSSS signal generation unit 801, the DM RS generation unit 802, the PSBCH generation unit 803 and the SC-FDMA transmission unit 804 depending on whether a PSSS/SSSS transmission condition is satisfied or not. For example, if a BS does not permit PSSS/SSSS transmission, the controller 800 may control the DM RS generation unit 802 and the PSBCH generation unit 803 so that they do not generate a signal. Alternatively, if a corresponding UE does not satisfy a PSSS/SSSS transmission condition, the controller 800 may control the PSSS/SSSS generation unit 801 so that it does not generate a signal.

The D2D synchronization signal generation unit 801 may generate a PSSS/SSSS sequence. The DM RS generation unit 802 and the PSBCH generation unit 803 may generate a DM RS sequence and a PSBCH including D2D system-related basic information, respectively. Finally, the SC-FDMA transmission unit 804 may generate an SC-FDMA signal by receiving D2D signals, generated by the PSSS/SSSS generation unit 801, the DM RS generation unit 802 and the PSBCH generation unit 803 as input, may map the SC-FDMA signal to physical layer resources configured for the transmission of each D2D signal, may convert the mapped signal into a radio frequency (RF) signal, and may transmit the RF signal.

Figure 9:
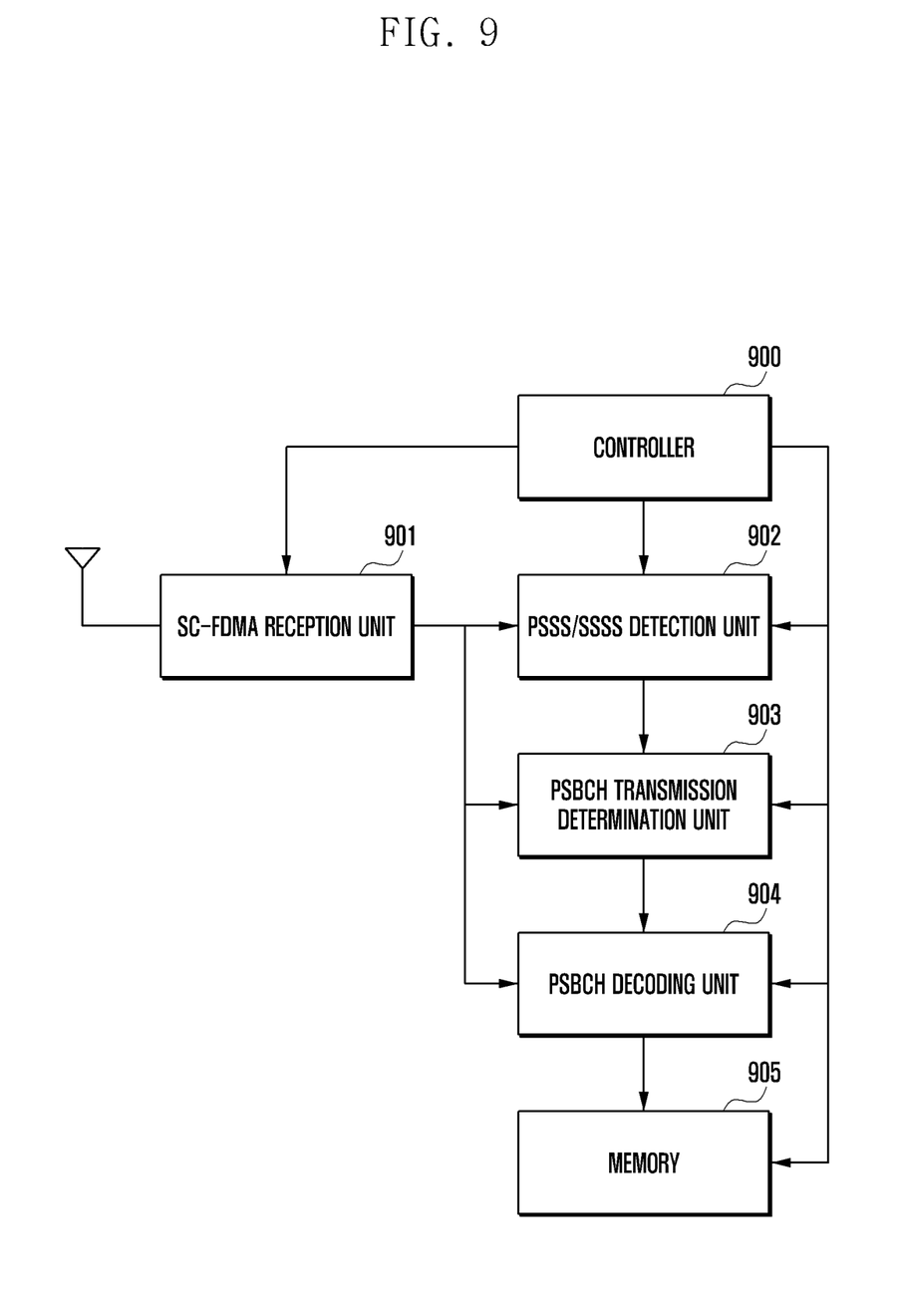
FIG. 9 is a block diagram showing a D2D UE receiver in a wireless communication system of the present invention.

FIG. 9 is a block diagram showing a D2D UE receiver in a wireless communication system of the present invention.

Referring to FIG. 9, the reception stage may include a controller 900, an SC-FDMA reception unit 901, a PSSS/SSSS detection unit 902, a PSBCH transmission determination unit 903, a PSBCH decoding unit 904 and memory 905.

The controller 900 may control the SC-FDMA reception unit 901, the PSSS/SSSS detection unit 902, the PSBCH transmission determination unit 903 and the PSBCH decoding unit 904 based on a PSSS/SSSS-related signal transmission/reception resource configuration. For example, if it is determined that a PSBCH has not been transmitted as a result of the determination of the PSBCH transmission determination unit 903, the controller 900 may control the PSBCH decoding unit 904 so that it does not attempt PSBCH decoding. The SC-FDMA reception unit 901 may receive an RF signal, may convert the RF signal into a baseband signal, and may perform demapping and SC-FDMA signal demodulation from physical layer resources configured for each D2D signal. The PSSS/SSSS detection unit 902 may take a correlation with respect to each received PSSS/SSSS sequence and perform D2D synchronization signal detection and synchronization. The PSBCH transmission determination unit 903 may function to determine whether a PSBCH has been transmitted according to a DM RS measurement or energy detection method as described above. The PSBCH decoding unit 904 may obtain D2D system-related basic information by performing PSBCH decoding based on a detected PSSS/SSSS, and may perform a PSBCH decoding reattempt for a specific time or for specific times under the control of the controller 900. The memory 905 may store a synchronization identifier associated with a PSBCH depending on whether the corresponding PBSCH was previously transmitted or PSBCH decoding is successful as described above. The controller 900 may read synchronization identifier information from the memory 905, and may control the PSBCH decoding reattempt-related UE operation of the PSBCH decoding unit 904.

Meanwhile, although the detailed embodiments of the present invention have been described in the detailed description, the present invention may be modified in various ways without departing from the scope of the present invention. Accordingly, the range of the present invention should not be limited to the aforementioned embodiments, but should be defined by the claims and equivalent thereof.

The invention claimed is:

1. A method of receiving a signal by a first terminal in a device to device wireless communication system, the method comprising:
receiving a synchronization signal transmitted from a second terminal;
obtaining a synchronization and a synchronization identifier based on the synchronization signal;
determining whether decoding of a broadcast channel based on the synchronization signal is successful;
selecting the second terminal as a synchronization reference, based on the decoding of the broadcast channel being successful;
determining whether a stored synchronization identifier and the obtained synchronization identifier are identical, based on the decoding of the broadcast channel being failed; and
determining whether to reattempt the decoding of the broadcast channel according to at least one of a demodulation reference signal and an energy level of at least one symbol, based on a result of the determination whether the stored synchronization identifier and the obtained synchronization identifier are identical.

2. The method of claim 1, wherein the determining whether to reattempt the decoding comprises measuring a measurement level of the demodulation reference signal or the energy level of the at least one symbol in which the broadcast channel is located, based on the decoding of the broadcast channel being failed.

3. The method of claim 2, further comprising:
reattempting the decoding of the broadcast channel based on the measurement level of the demodulation reference signal or the energy level of the at least one symbol being greater than or equal to a predetermined threshold.

4. The method of claim 3, wherein the reattempting of the decoding of the broadcast channel is performed for a predetermined specific time or specific times.

5. The method of claim 3, further comprising:
receiving a synchronization signal transmitted from a third terminal based on the measurement level of the demodulation reference signal or the energy level of the at least one symbol being lower than the predetermined threshold.

6. The method of claim 1, wherein the determining whether to reattempt the decoding comprises:
measuring a measurement level of the demodulation reference signal or the energy level of the at least one symbol in which the broadcast channel is located, in case that the stored synchronization identifier and the obtained synchronization identifier being not identical.

7. The method of claim 6, further comprising:
reattempting the decoding of the broadcast channel based on the measurement level of the demodulation reference signal or the energy level of the at least one symbol being greater than or equal to a predetermined threshold.

8. The method of claim 7, wherein the reattempt of the decoding of the broadcast channel is performed for a predetermined specific time or specific times.

9. The method of claim 7, further comprising:
receiving a synchronization signal transmitted from a third terminal based on the measurement level of the demodulation reference signal or the energy level of the at least one symbol being lower than the predetermined threshold.

10. The method of claim 1, wherein the determining of whether the decoding the broadcast channel being successful is performed based on a cyclic redundancy check included in a code block transmitted on the broadcast channel.

11. A first terminal of receiving a signal in a device to device wireless communication system, the first terminal comprising:
a transceiver to transmit and receive a signal; and
a controller configured to control to:
receive a synchronization signal transmitted from a second terminal,
obtain a synchronization and a synchronization identifier based on the synchronization signal,
determine whether decoding of a broadcast channel based on the synchronization signal is successful,
select the second terminal as a synchronization reference, based on the decoding of the broadcast channel being successful,
determine whether a stored synchronization identifier and the obtained synchronization identifier are identical, based on the decoding of the broadcast channel being failed, and
determine whether to reattempt the decoding of the broadcast channel according to at least one of a demodulation reference signal and an energy level of at least one symbol, based on a result of the determination whether the stored synchronization identifier and the obtained synchronization identifier are identical.

12. The first terminal of claim 11, wherein the controller is further configured to measure a measurement level of the demodulation reference signal or the energy level of the at least one symbol in which the broadcast channel is located based on the decoding of the broadcast channel being failed.

13. The first terminal of claim 12, wherein the controller is further configured to reattempt the decoding of the broadcast channel based on the measurement level of the demodulation reference signal or the energy level of the at least one symbol being greater than or equal to a predetermined threshold.

14. The first terminal of claim 13, wherein the reattempt of the decoding of the broadcast channel is performed for a predetermined specific time or specific times.

15. The first terminal of claim 13, wherein the controller is further configured to receive a synchronization signal transmitted by a third terminal based on the measurement level of the demodulation reference signal or the energy level of the at least one symbol being lower than the predetermined threshold.

16. The first terminal of claim 11, wherein the controller is further configured to:
measure a measurement level of the demodulation reference signal or the energy level of the at least one symbol in which the broadcast channel is located based on the stored synchronization identifier and the obtained synchronization identifier being not identical.

17. The first terminal of claim 16, wherein the controller is further configured to reattempt the decoding of the broadcast channel based on the measurement level of the demodulation reference signal or the energy level of the at least one symbol being greater than or equal to a predetermined threshold.

18. The first terminal of claim 17, wherein the reattempt of the decoding of the broadcast channel is performed for a predetermined specific time or specific times.

19. The first terminal of claim 17, wherein the controller is further configured to receive a synchronization signal transmitted by a third terminal based on the measurement level of the demodulation reference signal or the energy level of the at least one symbol being lower than the predetermined threshold.

20. The first terminal of claim 11, wherein whether the decoding the broadcast channel being successful is determined based on a cyclic redundancy check included in a code block transmitted on the broadcast channel.

* * * * *